J. J. JOHNSTON.
Grinding Mill.
No. 19,251.
3 Sheets—Sheet 1.
Patented Feb. 2, 1858.
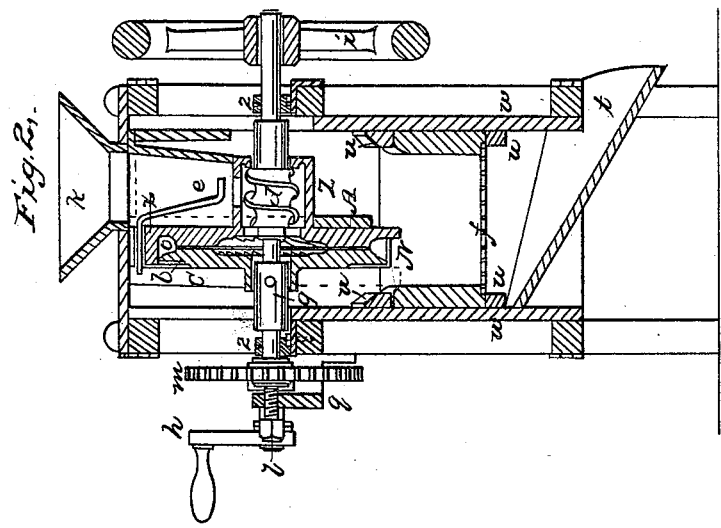
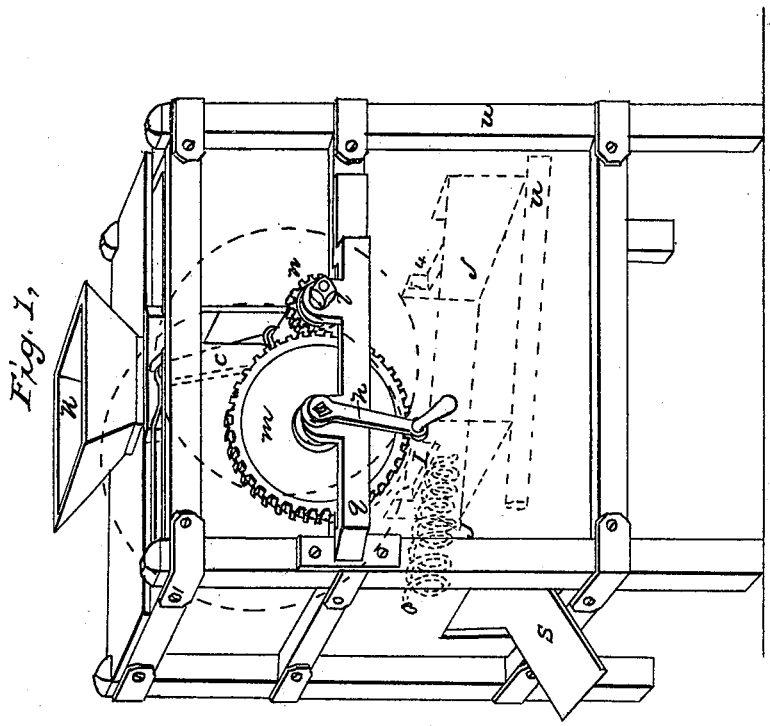

J. J. JOHNSTON.
Grinding Mill.
No. 19,251.
3 Sheets—Sheet 2.
Patented Feb. 2, 1858.
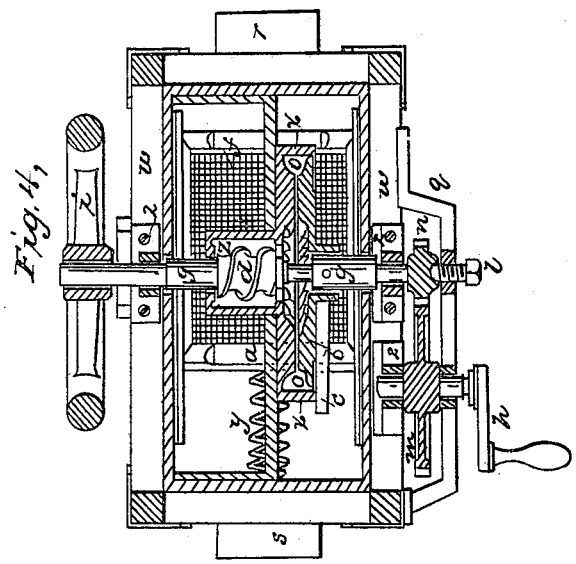
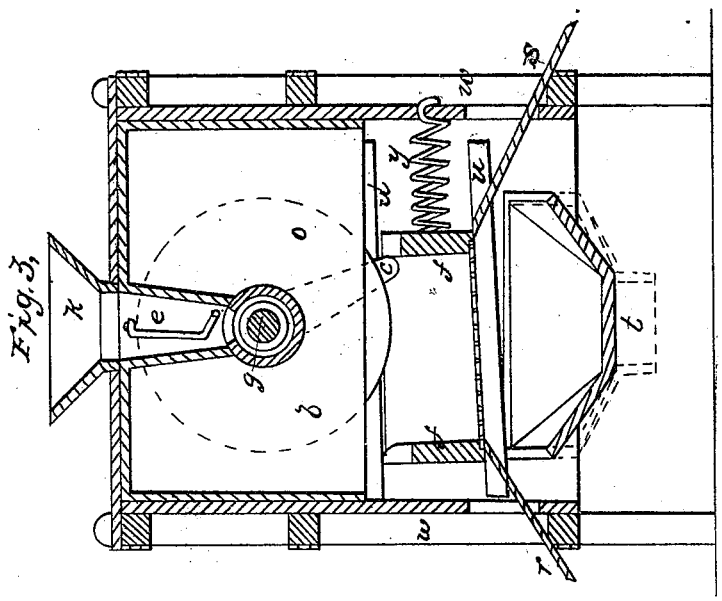

J. J. JOHNSTON
Grinding Mill.
No. 19,251.
3 Sheets—Sheet 3.
Patented Feb. 2, 1858.
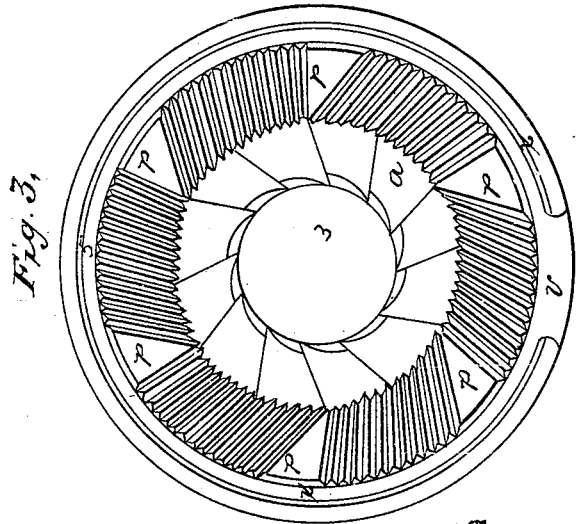
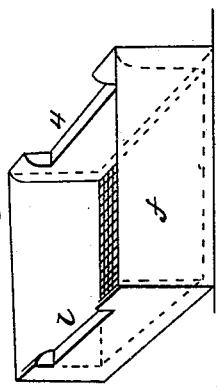
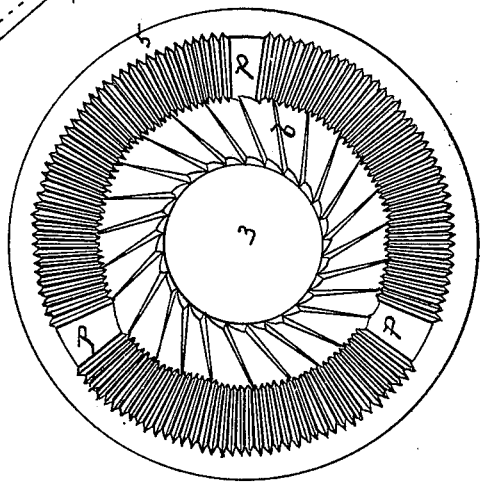
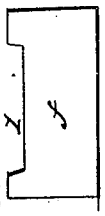
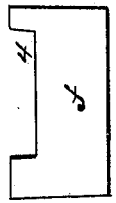

UNITED STATES PATENT OFFICE.

JAMES J. JOHNSTON, OF ALLEGHENY, PENNSYLVANIA.

GRAIN-MILL.

Specification of Letters Patent No. 19,251, dated February 2, 1858.

*To all whom it may concern:*

Be it known that I, JAMES J. JOHNSTON, of the city and county of Allegheny, in the State of Pennsylvania, have invented certain new and useful Improvements in Mills for Grinding Grain; and I do hereby declare that the following is a full and exact description thereof, reference being had to the accompanying drawings and to the letters of reference marked thereon, similar letters referring to similar parts.

The nature of my invention consists in the arrangement for feeding grain in at the hub of the stationary bur, and also in the arrangement for gathering, bolting and separating the flour.

To enable others skilled in the art to make and use my invention, I will proceed to describe its construction and operation.

In the accompanying drawings Figure 1, is a perspective view of the mill, Fig. 2, is a cut view crosswise of the mill, Fig. 3, is a cut view lengthwise of the mill, Fig. 4, is a top and cut view of the mill, Fig. 5, represents the stationary bur, Fig. 6 represents the revolving bur, Fig. 7, represents the bolting sieve, Figs. 8 and 9, are end views of the bolting sieve, Fig. 10, represents the feed screw or conveyer.

($a$) is the stationary bur, the hub of which is made large and is cored out for the purpose of receiving the feed screw marked ($d$), the teeth or cutters next to the center of this bur are made broad and deep, the greatest depth of cutting edge being next to the center of the bur, the second set of cutters or teeth are made fine and placed on lines diverging from the center of the bur; ($p$) are rubbing surfaces which project slightly above the teeth or cutters and are used for the purpose of preventing the teeth or cutters of the running and stationary bur coming in contact with each other, the rubbing surfaces must be arranged so that the rubbing surfaces of the revolving bur will always be opposite to some of the rubbing surfaces of the stationary bur, I have represented in the drawings nine of these surfaces six of which are on the stationary and three on the revolving bur, but I do not confine myself to any particular number as their number and size must be increased as the size of the burs increase.

($x$) is a flange on the outer periphery of the stationary bur, this flange and the recess marked (5) in the burs form the gathering chamber ($o$).

($v$) is a notch or opening made in the flange ($x$) for the purpose of allowing the flour to drop into the bolting sieve, there is a recess with a blank surface (marked 3) in the center of each bur which forms a chamber for the reception of the grain as it is thrown out of the hollow hub by means of the feed screw ($d$), the teeth or cutters on the face of the burs receive their supply of grain from this chamber.

($b$) is the revolving bur, the teeth or cutters next to the center of which are of the same form but only one half the size of those on the stationary bur. The fine cutters or teeth are placed on lines radiating from the center of the bur, by thus placing the cutters or teeth on lines diverging from the center of one bur and on lines radiating from the center of the other (as clearly shown in Figs. 5 and 6,) the cutters or teeth will have a shearing action on the grain, by means of this arrangement the grain is gradually broken or cut up into fine particles.

($c$) is a pin which is secured to the revolving bur and projects past the flange ($x$) of the stationary bur; this pin is used in connection with spring ($y$) for the purpose of operating the bolting sieve, this pin ($c$) is also used for operating the spring rod ($e$) in hopper ($k$), the spring rod ($e$) being used for the purpose of agitating the grain and thereby keeping a constant supply of grain in the hollow hub marked ($z$).

($f$) is the bolting sieve which moves in slides marked ($u$), there is a recess made in each end of this sieve marked (1) and (4) the bolting sieve is set on an inclination and moves twice for every revolution of the revolving bur, being moved forward by the spring ($y$) and backward by the pin ($c$), by this arrangement of the bolting sieve the fine flour passes through the bolting cloth or wire and drops down on the floor of the chute marked ($t$), the coarser flour termed "middlings" passes out at the recess marked (4) and falls on the floor or chute marked ($v$), the "bran" passes out at the recess marked (1) and falls on the floor or chute marked ($s$), by means of this simple arrangement the bran, middlings and flour, are separated the one from the other and deposited at different points of the mill.

($g$) is the shaft which operates the revolving bur and feed screw ($d$), and passes through the hollow hub ($z$) of the stationary bur.

($h$) is the crank or handle used for giving motion to the mill.

($i$) is the balance wheel which is placed on the end of shaft ($g$), the balance wheel should be made at least twice the diameter of the revolving bur.

($l$) is a set screw used for regulating the grit of the flour.

($m$) is the driving wheel and ($n$) is the pinion which is placed on the end of shaft ($z$).

($o$) is the gathering chamber which is formed by the recess marked (5) in the burs and the flange ($x$), the ground grain is thrown into this chamber, and by the action of the revolving bur is gathered and thrown out through the opening ($v$) into the bolting sieve ($f$).

($q$) is the bearing used for supporting the driving wheel ($m$), and set screw ($l$).

(2) are the journal boxes.

($w$) is the frame or casing of the mill, and should be made by framing and then lined with boards.

The operation of my improvement is as follows:—The grain is put into the hopper and is carried from the hopper, by means of the feed screw into the receiving chamber, the cutters or teeth are supplied from the receiving chamber, the grain is broken up into small pieces by the large cutters or teeth next to the center of the burs, these small pieces of grain then undergo a shearing process, which is accomplished by setting the fine cutters on lines radiating from the center of one bur and on lines diverging from the center of the other, the ground grain is thrown into the gathering chamber and is then collected and thrown into the bolting sieve through the opening in the flange of the stationary bur, the flour is then separated by means of the bolting arrangement. The burs should in every case be made of hard or chilled cast-iron, the cutters or teeth being cast on the face of the burs, the hubs should be made of soft cast-iron, this can be done by making the hubs and burs in different pieces, the balance of the work is left to the good judgment of the mechanic.

What I claim as my invention and desire to secure by Letters Patent of the United States is.

1. The use of the pin ($c$) on the revolving bur for the purpose of operating the bolting seive ($f$) and spring rod ($e$) as herein described and set forth.

2. The arrangement of the hopper ($k$), spring rod ($e$), hollow hub ($z$) and feed screw ($d$), as herein described and for the purpose set forth.

3. The arrangement of the recess (5) in the burs and flange ($x$) on the stationary bur for the purpose of forming the gathering chamber ($o$), as herein described and for the purpose set forth.

4. The arrangement in the face of the burs, of the recess with the blank surface marked (3), in connection with the arrangement of the teeth or cutters and rubbing surfaces ($p$), as herein described and for the purpose set forth.

5. The arrangement of the spring ($y$), the bolting sieve ($f$) with the recess (1) and (4), and the chutes ($s$), ($t$), and ($r$), as herein described and for the purpose set forth.

JAMES J. JOHNSTON.

Attest:
 JOHN KIRKPATRICK,
 ALEXANDER HAYS.